United States Patent [19]
Fontaine

[11] 3,761,138
[45] Sept. 25, 1973

[54] CAPTIVE AIR BRAKE SYSTEM FOR MOTOR VEHICLES

[76] Inventor: John G. Fontaine, 2817 N.E. 26th Ct., Fort Lauderdale, Fla. 33306

[22] Filed: Apr. 19, 1971

[21] Appl. No.: 135,194

[52] U.S. Cl.......................... 303/9, 303/15, 303/19
[51] Int. Cl.............................................. B60t 13/28
[58] Field of Search ...................... 303/18, 19, 2, 9, 303/13, 15, 28, 80, 85; 188/106 P

[56] References Cited
UNITED STATES PATENTS

| | | |
|---|---|---|
| 3,090,359 | 5/1963 | Hoppenstand ................. 303/13 UX |
| 3,385,636 | 5/1968 | Cruse ............................. 303/9 UX |
| 3,487,451 | 12/1969 | Fontaine ............................. 303/19 |
| 3,674,321 | 7/1972 | Fontaine ............................... 303/2 |

Primary Examiner—Duane A. Reger
Attorney—Erwin A. Yaeger

[57] ABSTRACT

A brake system in which a brake-applying mechanism can be caused to apply vehicle brakes by means of captive air of a predetermined degree of pressure while the vehicle is in motion or has its motor running, and which can have its brakes applied by air at a reduced pressure while the vehicle is stationary or is parked. A metering valve is employed in the system to control the opposing force to captive air and placed in the general area where the master cylinder is located, the valve being provided with a foot pedal. The invention further contemplates the employment of a seat switch that is operable to cause brake application when the driver of the vehicle moves from his seat.

5 Claims, 6 Drawing Figures

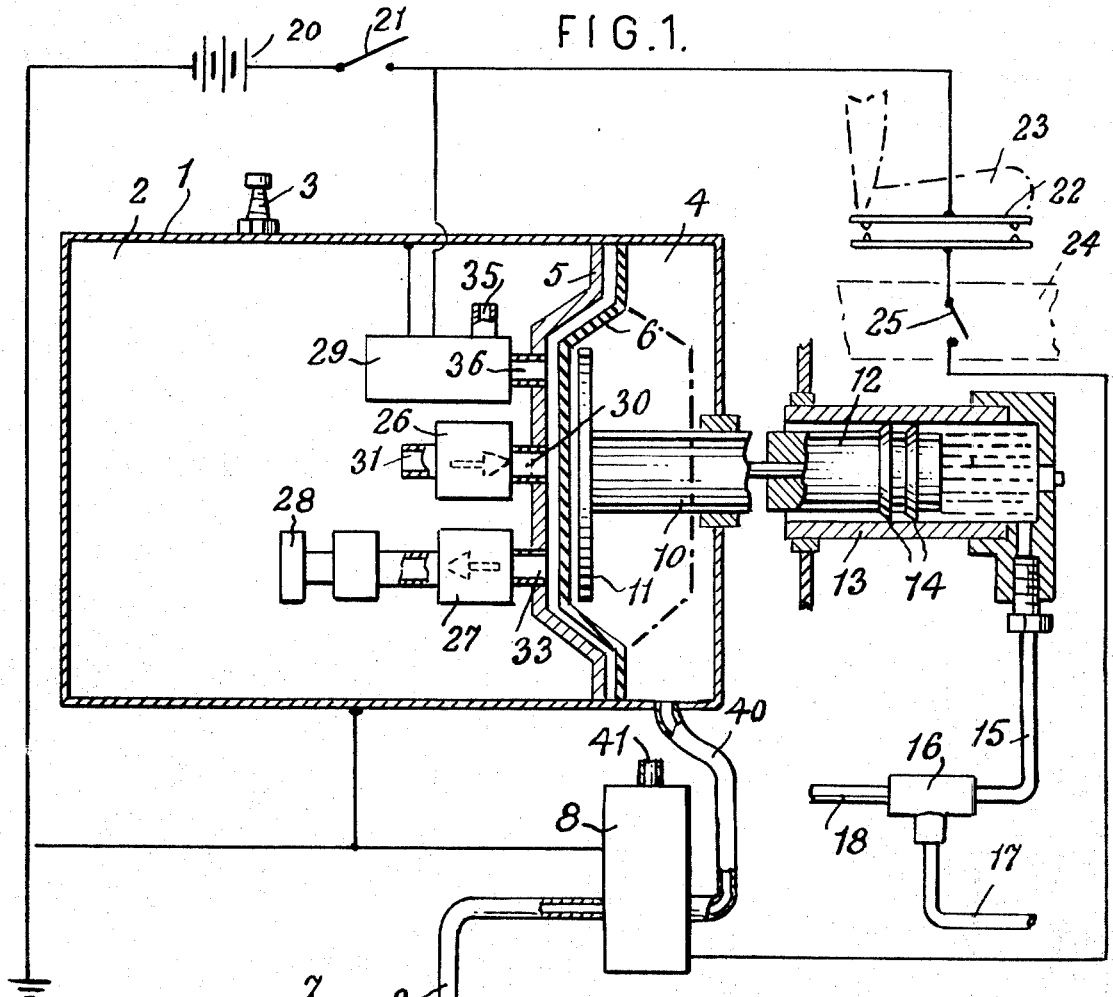
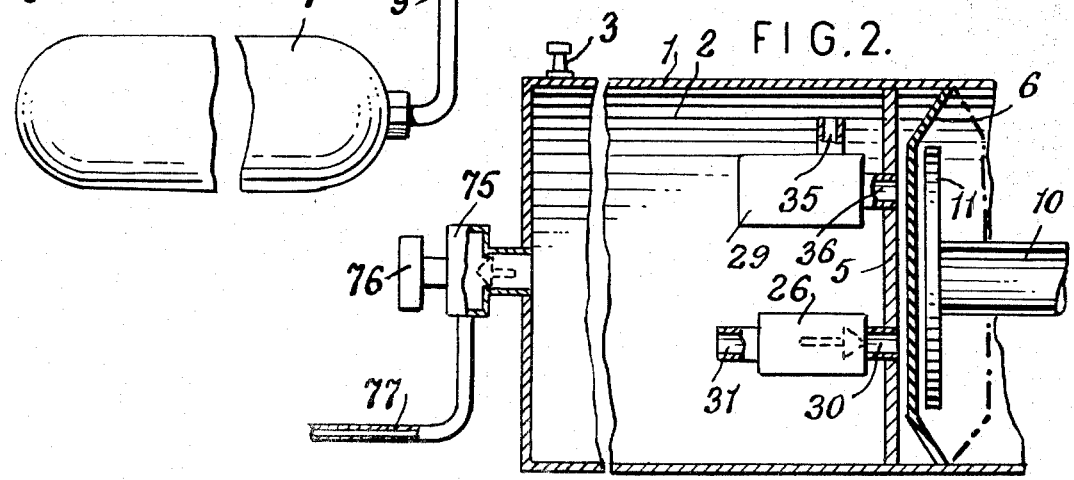

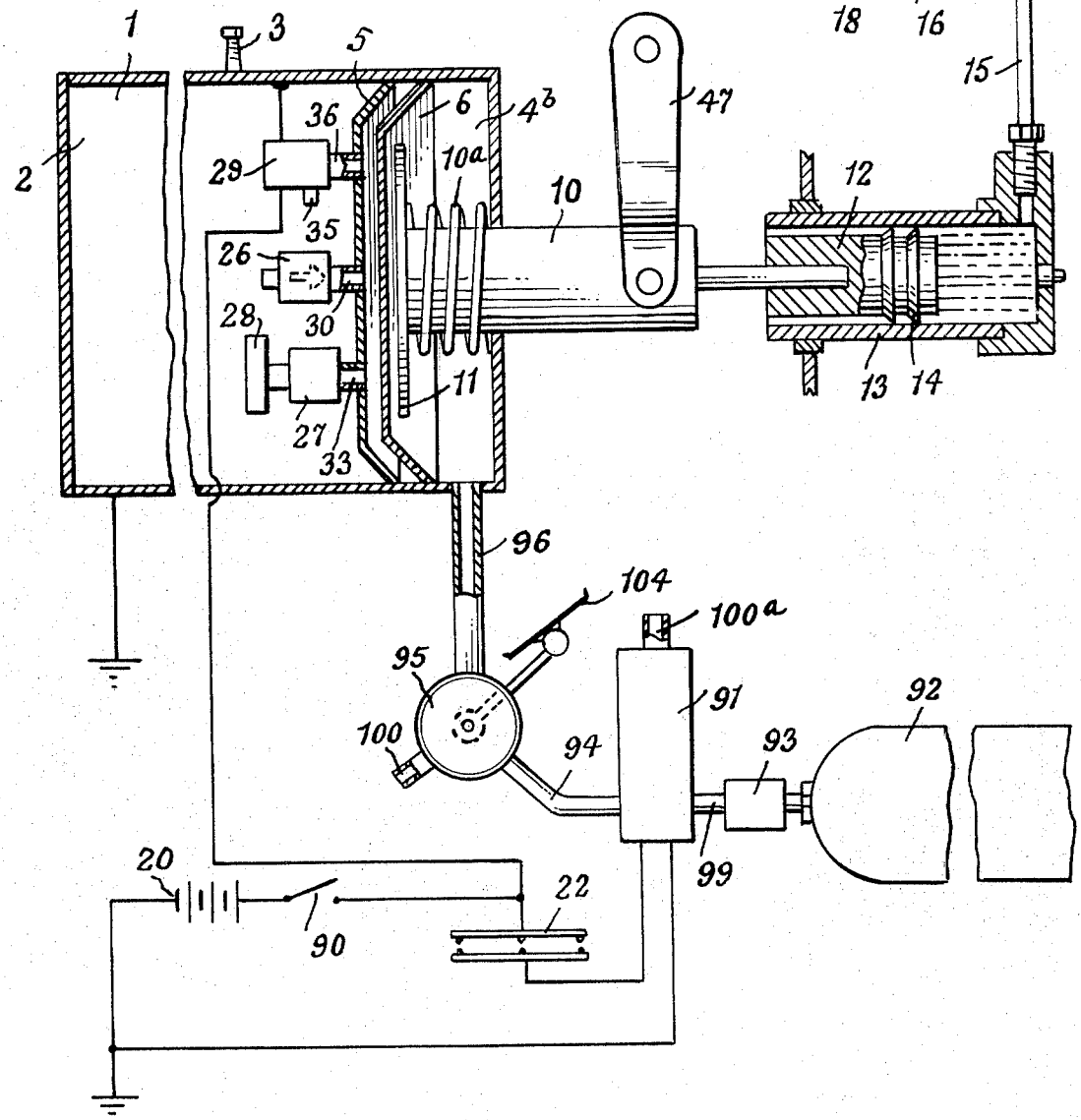

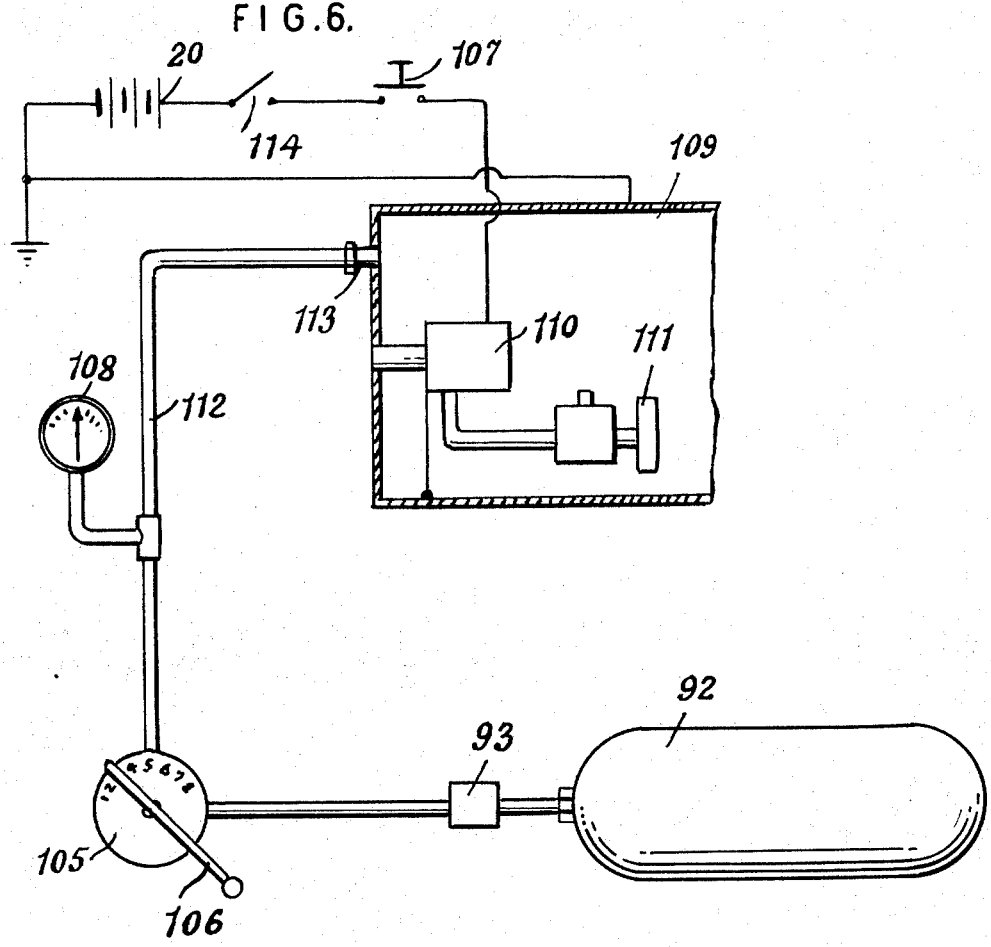

CAPTIVE AIR BRAKE SYSTEM FOR MOTOR VEHICLES

BACKGROUND OF THE INVENTION

The present invention constitutes an arrangement of the kind disclosed in my application for patent Ser. No. 50,538, now U.S. Pat. No. 3,674,321. In that application there is shown a backup or emergency captive air brake system that applies the brakes by captive air pressure on a diaphragm and hence to the brakes, with a given force determined by the amount of compressed air pressure contained in a captive air chamber. There is used an opposing force of sufficient strength to normally keep the brakes released, the mechanism being operable on all vehicles provided with hydraulic brakes, air brakes or mechanical brakes.

It is known that a greater braking force is necessary to halt a vehicle when the vehicle is in motion than to secure it against movement when it is motionless or is parked, and it is desirable in an emergency, to bring a vehicle when in motion to a rapid or controlled stop. It is also desirable to not keep brakes applied at full force for long periods of time when the vehicle is parked because in some cases brake drums have been known to distort, particularly when hot, and hydraulic brake fluid under high pressure for long periods has been known to seep or to leak past the seals.

Therefore, one of the objects of the invention is to provide an improved braking system that applies the brakes when the vehicle is in motion, with high pressure air, and while parked it serves to apply the brakes with lower pressure captive air.

Another object of the invention is to provide a foot-controlled metering valve in the general area where the master brake cylinder is now located, such metering valve acting to control the opposing force to the captive air and as the foot pedal for the valve is depressed, the opposing force will be reduced. Thereby the system will, in effect, replace the braking system as it now exists with a more reliable and fail-safe brake control.

Another object of the invention is to provide a switch that can be either installed within or fastened to the driver's seat of the vehicle, such as that disclosed in my U.S. Pat. No. 3,487,451. An arrangement of that kind is such that should the driver leave his seat for any reason when the vehicle is in motion, the brakes will be automatically applied by the high pressure captive air and thereby bring the vehicle to a rapid, controlled and safe stop.

Another object of the invention is to provide a system so arranged that when the ignition key is turned off, the brakes will be applied with relatively low pressure air.

Still another object of the invention is to provide an on-off emergency switch on the instrument panel located in near proximity to the driver that when thrown to emergency it will bring the vehicle, when it is in motion, to a rapid, controlled and safe stop.

It is anticipated that small computers located within the vehicle will soon be making their appearance on the market and they will have the effect of adding to the safety of the driver and passengers in motor vehicles. With a captive air brake system having a specified pressure in the captive air chamber and taking into consideration the weight of the vehicle, it can be determined precisely the stopping distance of the vehicle regardless of the speed at which it is traveling which, of course, is necessary to result in a workable braking apparatus to be controlled by computer. It will be understood that with the arrangement herein disclosed control can be easily had.

Another object of the invention is to provide a workable braking system for vehicles to be controlled not only by the means herein described but also by an inboard computer.

DESCRIPTION

In the accompanying drawing, wherein illustrative embodiments of the invention are disclosed, FIG. 1 is a diagrammatic view of a braking system constructed in accordance with the invention;

FIG. 2 is a slightly modified embodiment of the invention;

FIGS. 5 and 6 show other embodiments.

Figure 3:
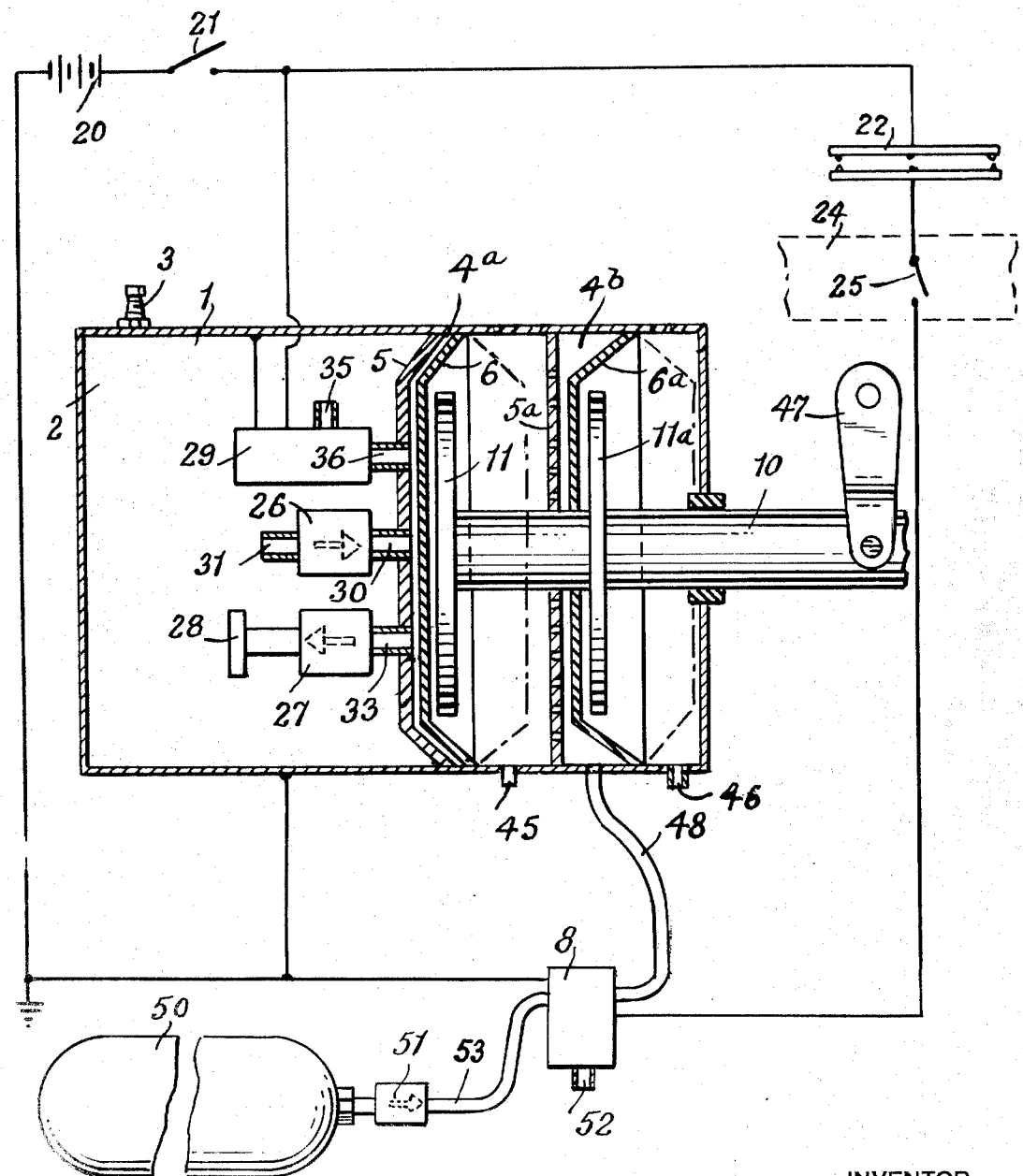
FIG. 3 shows another embodiment of the invention in which vacuum is used.

Referring to the drawings, and more particularly to FIG. 1 thereof, there is shown therein at 1 a container or tank, preferably of cylindrical formation, provided with an internal chamber 2 that contains captive air under pressure and to a degree required for suitable brake application depending upon the weight of the vehicle and on other factors.

Said chamber 2, containing the captive air, can be filled to the required degree through a conventional air valve shown at 3. It is also possible to provide means by which the tank can not only be filled with air but the air can also be maintained therein at a constant and predetermined pressure.

Fitted within the container 1 and dividing it into two chambers or compartments shown respectively at 2 and 4 is a fixed and rigid partition 5, which in the form shown, is of dished or cupped formation. Located within the compartment 4 is a dished or cupped flexible diaphragm 6 which conforms in shape to the partition 5. The diaphragm 6 may be composed of rubber, plastic or other suitable material and it is secured at its peripheral edge to the circumferential wall of the container 1.

The position of the diaphragm shown in FIG. 1 is that which it assumes when it is normally under a counter pressure from compressed air from a tank shown at 7. A three-way solenoid switch valve 8 is interposed in the line 9 leading from the tank 7 to the chamber or compartment 4.

Axially movable through an end wall of the container 1 is a piston rod 10 provided at one end with a circular disk or head 11. While the drawing shows the disk or head 11 as being slightly spaced from the diaphragm it is in practice maintained in constant contact with the diaphragm, and pressure means such as the spring 10a shown in FIG. 5, may be used to keep the disk against the diaphragm.

Means such as the lever 47 in FIG. 3, can be coupled to the piston rod 10, which means extends to a brake-application mechanism of known character to cause the application of the brakes of the vehicle by the axial shift of the piston rod.

The piston rod 10 carries a piston 12 operative in a cylinder 13 containing the hydraulic brake fluid and a fluid reservoir not shown may be connected to the cylinder in the conventional manner. The piston 12 is provided with sealing rings 14. The conduit 15, leading from the cylinder 13, connects to a shuttle valve 16, which might possibly be omitted. By piping extending from the valve 16 and indicated at 18 communication to the master cylinder of the brake system is established, and the piping shown at 17 extends to the brake wheel cylinders.

A source of current, such as the battery of the vehicle, is shown at 20 and in the circuit leading therefrom as shown is the ignition switch 21. At 22 is shown a seat switch which can be of the type disclosed in my U.S. Pat. No. 3,487,451 or of another suitable type and one which remains in an open condition as long as the seat 23 for the driver of the vehicle is unoccupied and which switch closes when the driver is seated upon the seat and remains closed as long as the driver remains seated. The components of the system are electrically connected in the circuit as shown in the drawings.

Provided on the instrument panel, which is diagrammatically indicated at 24, is an on-off emergency switch 25. At 26 is shown a one-way check valve and at 27 is shown another one-way check valve. A regulator valve is shown at 28. The several valves mentioned, as well as a two-way normally closed solenoid switch valve shown at 29 may be enclosed within the tank or container 1 as shown. The one-way check valve 26 will deliver captive air through port 30 to the captive air chamber 2 and exhausts at the port 31.

When the ignition circuit is open by means of the switch 21 being placed in an "off" position, the solenoid two-way valve 29 remains closed. That is to say, no air from chamber 2 passes through the valve to reach the diaphragm 6. At this time, however, the check valve 27 and the regulator valve 28 permit the captive air under reduced pressure, to pass through the port 33 and to exert its force against the diaphragm 6. Such reduced air pressure, being regulated by the regulator valve 28, is sufficient to cause the brakes to remain applied but under less pressure than would be the case when the full pressure of the captive air was applied by the solenoid valve 29 being open. The check valve 27 will only allow the captive air to flow from chamber 2 through the port 33 to exert its reduced pressure against the diaphragm, this valve 27 being a protective valve. It permits the air to flow in one direction only; namely, toward the diaphragm, while the solenoid valve 29 can allow the captive air to flow in either direction, when the switch 21 is closed.

The check valve 26 is another protective valve which can permit captive air to return to chamber 2 in the event that the solenoid valve 29 should become inoperative.

In describing the operation of the brake system shown in FIG. 1 it can begin by assuming that the vehicle is in motion or at least has its motor running, the motor having been started when the driver seated himself on the driver's seat 23. At this time the switches 21, 22 and 25 are closed, the driver being then seated on the seat 23. At this time also, the solenoid valve 8 is in such a condition that it allows the flow of high pressure air from the tank 7 through the piping 9 and past the valve 8 and through piping 40 to enter the chamber 4. This high pressure air, of greater pressure than the air in the compartment 2, provides a counter pressure to the captive air in the chamber 2 and since the high pressure air is of greater pressure than the captive air, it forces the diaphragm 6, the disk 11 and hence the piston rod 10 to the left and thus maintains the brakes in an unapplied condition.

As long as the ignition switch 21 remains closed, current will flow to the solenoid valve 29 to open the same and permit the captive air in chamber 2 to flow through the port 35 past the valve 29 to emerge from port 36 and exert its force against the disphragm 6. If at this time the high pressure air from the tank 7 would be exhausted from chamber 4 by opening switch 22 or switch 25 the brakes will become applied. During this period the solenoid valve 8 will have shut off and the flow from the tank 7 to the chamber 4, the high pressure air therein having been exhausted therefrom through piping 40 and outlet 41, so that any air remaining in the chamber 4 will be insufficient to prevent the captive air from acting upon the diaphragm to apply the brakes.

When the switch 21 is opened as when the driver shuts off the motor, the current to the solenoid valve 29 will cease whereupon the flow of captive air through the port 36 will end, the valve having been closed. Then any flow of captive air to the diaphragm through port 36 will cease and the flow will only be through the regulator valve 28 and through the check valve 27. Since this will take place when the car is motionless or the motor is not in operation, the pressure of the captive air then exerted on the diaphragm may be controlled or regulated at a predetermined rate as determined by the valve 28, such reduced air pressure passing through the port 33 to reach the diaphragm.

Should the driver arise from his seat for any reason, when the vehicle is in motion, the solenoid valve 8 will be actuated and be caused to cut off the flow of air from the tank 7 and thereby cause the interior of the chamber 4 to communicate with the atmosphere through the piping 40 and the outlet 41, thus removing the pressure in chamber 4 and permitting the captive air to apply the brakes.

It will be apparent from the foregoing that while the motor of the vehicle is in operation or while the vehicle is in movement with the driver in his place on the seat, the brakes will be maintained in an off condition, yet can be capable of instant application when the driver arises from his seat. It will also be apparent that while the vehicle is stationary or is parked the brakes will become effective and can be maintained in an applied condition with relatively light air pressure. The advantage of this arrangement is, among other things, the avoidance of greater pressure than is really necessary on the brakes while the vehicle is parked.

In the embodiment shown in FIG. 2, the partition 5 is shown as being flat as distinguished from being dished or cupped as in FIG. 1. In the construction of FIG. 2 the convex face of the diaphragm faces the flat face of the partition. The regulator valve, such as shown at 28 in FIG. 1, as well as the check valve, have been omitted. When the counter air pressure obtained from the tank 7 is exhausted from the chamber 4, the captive air from chamber 2 will flex the diaphragm as shown in dotted lines in FIG. 2. causing the diaphragm to reverse its shape so that its then concave face is directed toward the partition 5, thus providing additional spacing between the diaphragm and the partition and permitting expansion of the captive air with a substantial reduction in its pressure. Thus, the diaphragm will then be under reduced pressure yet under a pressure sufficient to maintain the brakes in applied condition during standing or parking of the vehicle. The partition 5 is shown as having a flat surface. It is anticipated that there will be sufficient space between the diaphragm and the partition 5 to retain captive air at a reduced rate inasmuch as it will never be completely exhausted; sufficient air remaining in the chamber to apply the brakes at a reduced pressure when parked. The check valve shown in FIG. 2 is the same as the check valve shown at 26 in FIG. 1.

The on-off emergency switch shown at 25 is preferably located on the instrument panel in close proximity to the driver and is normally in a closed position, but in an emergency the switch can be thrown which in turn breaks the electrical circuit to valve 8, causing compressed air to be blocked from tank 7 through piping 9 at valve 8. Simultaneously port 41 on valve 8 is open to atmosphere exhausting compressed air in chamber 4 through line 40 and out port 41. The captive air in chamber 2 at this juncture will have no opposing force in chamber 4 and also Solenoid Valve 29 will be open and high pressure captive air will flow through ports 35 and 36 against the disphragm 6 and the brakes will be applied. Also, on-off emergency switch 25 will find use as a parking brake when the motor is running and the driver is in the seat by throwing switch 25 to emergency.

The embodiment shown in FIG. 3 is similar in many respects to that shown in FIG. 1, a primary difference consisting in the employment of a vacuum chamber instead of a chamber containing high pressure air.

In the embodiment shown in FIG. 3 there is disclosed the chamber 2 in the container or tank 1 in which the captive air under pressure is contained. The air valve 3 permits the filling of the chamber 2 with the captive air having the pressure required to apply the brakes with the needed braking force. In the form shown the interior of the container 1 has two partitions 5 and 5a dividing the container into the chambers 2, 4a and 4b. The partition 5a can be perforated or can be foraminous to allow the passage of the captive air.

The chamber 4a contains a diaphragm 6 similar in construction to the diaphragm shown in FIGS. 1 and 2 and chamber 4b contains a diaphragm 6a. These diaphragms are both peripherally attached to the wall of the container 1 and they are capable of flexure under pressure of the captive air to axially shift the piston rod 10. The piston rod 10 carries two heads or disks 11 and 11a, each of these disks being arranged for cooperation with one of the diaphragms. That is to say, when the diaphragms are flexed by the pressure of the captive air on them they will move the disks and the piston rod accordingly.

In the drawings, the disks 11 and 11a are shown, for clarity in illustration, as slightly spaced from the adjacent diaphragms, but in actual practice the disks are maintained in contact with the diaphragms and to insure such contact spring means such as shown at 10a in FIG. 5 can be arranged around the piston rod. While two diaphragms and associated parts are shown in FIG. 3, more can be used.

In FIG. 2 is shown a regulator valve 76 which, through check valve 75 and air supply piping 77 will maintain the captive air in container 1 at a definite pressure. This can be used in conjunction with the container 1 of FIGS. 1, 2 and 3.

At 50 is shown a vacuum tank, or it can be the intake manifold of the vehicle and a check valve 51 is provided in the piping 53 leading from the tank or manifold 50 to a three-way solenoid valve 8. The branch 48 of the piping leads into the chamber 4b.

The solenoid valve 29; the check valves 26 and 27 and the regulator valve 28 are arranged in respect to the partition 5 and diaphragm 6 in the same manner as has been described in connection with the embodiment shown in FIG. 1.

In operation, the embodiment of FIG. 3 is substantially as follows:

When the solenoid valve 8 is energized or when there is communication between the interior of the chamber 4b and the tank or manifold 50, vacuum or suction will be present in the chamber 4b. The valve port shown at 52 is the exhaust port and at this time the valve 8 will be in a condition to close off this port. In the position just mentioned, the parts will be effective to hold the brakes in an unapplied condition. When the valve 8 is de-energized or is in a position in which communication between the tank or manifold 50 and the branch 48 is broken, the exhaust port 52 will be placed in communication with the branch 48 whereby atmosphere will be caused to enter this chamber, removing opposing force to the captive air, thereby permitting the brakes to be applied. The brakes will remain in the applied condition as long as no vacuum is present in the system. Since the vacuum is developed by motor operation, it follows that when the motor is not running the brakes will remain on while the vehicle is parked or at any time that the motor is not in operation. When the motor is started and chamber 4b is again under vacuum by the movement of the solenoid valve 8 to an energized position, the brakes will be released. The outlets shown at 45 and 46 are breather openings and they allow atmosphere to enter and exhaust.

The operation of this embodiment as far as valves 29, 26, 27 and 28 are concerned, are similar to that of the embodiment shown in FIG. 1, that is to say, when the ignition switch 21 is closed, current will flow to the Solenoid Valve 29 to open the same. Captive air under higher pressure will flow from chamber 2 through port 36 momentarily, or until the engine is started, at which time brakes will be released by a greater force of atmospheric pressure controlled by vacuum. When the switch 21 is opened, as when the driver shuts off the motor, the current to the solenoid valve 29 will cease, whereupon the flow of captive air through the port 36 will cease and then any flow of the captive air to the diaphragm 6 will be through the regulator valve 28 and the check valve 27.

Figure 4:
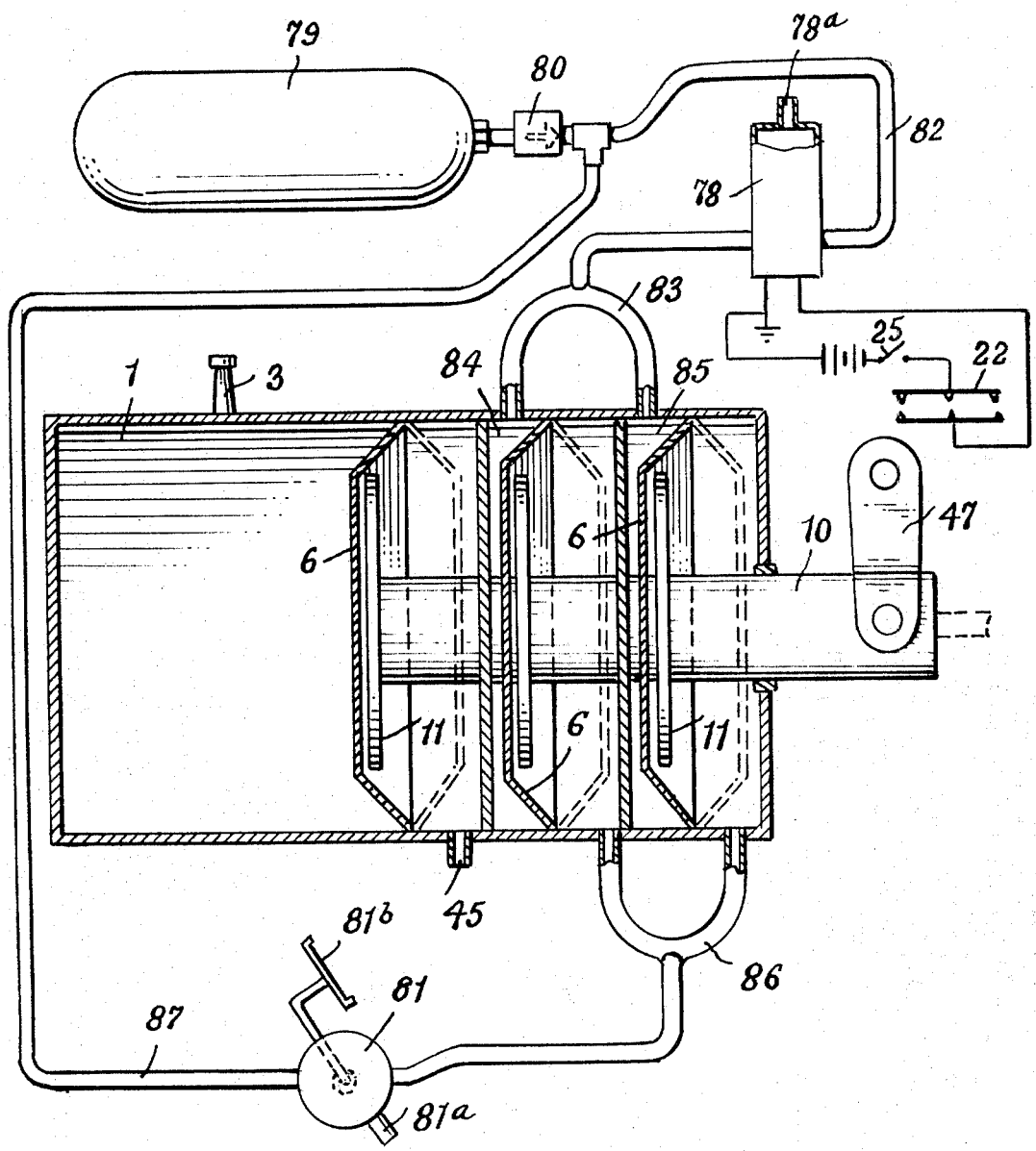
FIG. 4 shows another embodiment.

In the embodiment of the invention shown in FIG. 4, the tank shown at 79 is a vacuum tank or can be the intake manifold of a vehicle and it provides for vacuum in the container or tank 1. At 78 is shown a solenoid valve in circuit with the seat switch shown at 22. The solenoid valve 78 is connected by piping 82 to the vacuum tank or manifold 79, with a check valve 80 in the line. Piping 83 establishes communication between the solenoid valve 78 and the chambers 84 and 85 at one side of the diaphragms 6, which diaphragms and partitions are provided as heretofore described.

Piping 87 extends to a foot-controlled or possibly hand-operated metering valve 81 and from which piping 86 extends to communicate with chambers 84 and 85 at points behind the concave sides of two of the diaphragms 6. The piston rod 10 and associated parts are axially movable for brake application as heretofore described.

The operation of the structure shown in FIG. 4 is substantially as follows:

The piston 10 and its associated parts are vacuum suspended. That is to say, that as long as the motor of the vehicle is in operation while the driver is on his seat, the vacuum exerted from the tank 79 or the manifold of the vehicle will hold the brakes in an off condition. When the driver is so seated the solenoid valve 78 becomes operative to close off atmosphere through the valve port 78A and the brakes are maintained in a released condition. When the driver leaves his seat and thus causes the opening of seat switch 22, Solenoid Valve 78 closes port from line 82 and simultaneously opens line 83 to atmosphere 78A, causing application of the brakes.

The same effect is attained when pressure is imposed on pedal 81B which, when the pressure is gradually applied, will replace atmospheric pressure already in chambers 84 and 85 by vacuum and/or meter the atmospheric pressure in those chambers and cause application of the brakes to any degree required.

In the embodiment shown in FIG. 5 and in the circuit therein disclosed, an ignition switch is shown at 90 and the seat switch at 22. The compressed air container 1, partition 5, diaphragm 6, the piston 10 biased by the spring 10a to cause it to follow the diaphragm, and the valves 29, 26, 27 and 28 are similar to the like parts shown in FIG. 1 and heretofore described.

A solenoid valve is shown at 91. Compressed air is contained in the tank 92 and when the driver is on the seat, the solenoid valve 91 will be energized through the electrical circuit shown, and air from the tank 92 passing check valve 93, will pass out of valve 91, through piping 94 to a metering valve 95, leaving metering valve 95 through the piping 96 to enter the chamber 4b of the container 1. At this time the air so entering the chamber 4b will be effective to act in opposition to the captive air in chamber 2, and release the brakes. By means of the metering valve 95 the degree of air pressure on the diaphragm 6 to effect brake application can be readily controlled.

If the switch 90 or the seat switch 22 is open, the Solenoid Valve 91 will be de-energized, closing off the port 99 so that the air pressure in chamber 4B will be exhausted through piping 96 and through metering valve 95 and through piping 94, and out port 100A of the valve 91, permitting the pressure in the chamber 2 of the container 1 to move the diaphragm 6 and piston 11 in an axial way to apply the brakes. If the switches 90 and 22 are closed, and the metering valve 95 is depressed, fully, or all the way, compressed air from tank 92 will be blocked at port 94 and compressed air in port 4B will be fully exhausted through piping 96 and through metering valve 95 and out port 100 of that valve.

When the metering valve 95 is gradually depressed by pressure exerted on the foot pedal 104 or by a suitable hand lever as an alternative, the compressed air in the chamber 4b will be gradually exhausted through the port 100 applying the brakes to any desired degree. When pressure on the foot pedal is decreased the port 94 will be opened and compressed air will flow from the tank 92, through piping 94, valve 95 and piping 96 to reach the chamber 4b and release the brakes. If by any chance the piping 96 or 94 should break, compressed air will be lost from chamber 4b and the brakes will be applied. Each of the valves 91 or 95 will operate separately or together.

In the embodiment shown in FIG. 6, a regulator valve is shown at 105 and it is calibrated to enable it to be adjusted by the movement of a lever 106 to permit compressed air to pass to the required extent according to vehicle load. At 107 is shown a normally open push button switch and a pressure gauge is shown at 108. These elements are located preferably close to the driver's seat and the captive air for the container 109 can be increased according to the load imposed on the vehicle to thereby secure the required brake pressure. A normally closed solenoid valve is shown at 110 and a regulator valve is shown at 111. With this arrangement, regardless of what might occur, there would always remain sufficient air in the chamber controlled by the regulator 111 for minimum requirements. The push button switch 107 is to reduce the captive high pressure when the weight on the truck is reduced upon unloading.

In the embodiment of FIG. 6 the diaphragm and other elements can be employed in the manner shown in FIG. 1. The valve shown at 113, communicating with the compressed air container 109 may be a tire valve type and it connects to the regulator valve 105 by piping 112 in which the valve 108 is located.

It will be understood that the embodiments shown in the drawings are illustrated diagrammatically and that in actual practice refinements can be added and the parts differently arranged. For example, the elements through which the piston rods are movable will be suitably bushed and provided with sealing rings to avoid the possibility of air leakage at these and other locations in the structure, and other changes may be made without departing from the spirit of the invention.

What I claim is:

1. A brake mechanism comprising, brake-application mechanism, means for applying captive air under pressure to such mechanism to cause the application of the brakes on a vehicle, counter air pressure means for applying said counter air of greater force than the captive air on said brake-application mechanism to thereby prevent the captive air from applying the brakes, means for reducing the pressure of the captive air while the motor of the vehicle is not in operation to thereby enable the brakes to be applied at a reduced air pressure of the captive air while the vehicle is stationary, a container, the captive air being maintained in said container, the container having a diaphragm dividing it into two chambers, one of the chambers containing the captive air and the other chamber intermittently receiving the high pressure air, electrically controlled valve means for causing the captive air to exert its full force against the diaphragm, electrically controlled means for controlling the flow of the higher pressure air against the diaphragm, and the means for reducing the pressure of the captive air being a regulator valve located within the chamber in which the captive air is contained.

2. A brake system for motor vehicles comprising, brake-applying mechanism, means for applying captive air under pressure to such mechanism to enable the application of the brakes to be secured when the vehicle is in motion, electrically controlled means for causing the captive air to exert its full force on the brake-applying mechanism for causing brake-application, electrically controlled means for controlling the flow of a higher pressure air to reduce the pressure of the captive air and to secure a condition to enable the brakes to be applied during parking, and while the captive air is at such reduced pressure, the means for reducing the pressure of the captive air being an air regulating device.

3. A brake mechanism according to claim 1, including an electrical circuit for controlling the captive air and the high pressure air, the circuit including a seat switch effective to cause the exhaust of the high pressure air from its chamber when the seat of said switch is unoccupied.

4. A brake mechanism comprising, a container divided by a partition and a diaphragm into two chambers, the first of said chambers containing captive air under pressure and which urges its force against the diaphragm to flex the same, brake-application means controlled by the diaphragm and caused to apply the brakes of a vehicle when the diaphragm is flexed in one direction, the second chamber intermittently receiving high pressure air at selected intervals to exert a counter force against the diaphragm and prevent its movement toward brake-application, an electrical circuit including means for controlling the flow of the captive air to the diaphragm, a regulator valve for controlling the pressure of the captive air to the diaphragm when the electrical circuit is open-circuited, electrically controlled means for controlling the flow of the high pressure air into the second chamber, and switch means included in the electrical circuit.

5. A brake mechanism according to claim 4, wherein the switch means includes an ignition switch and a seat switch.

* * * * *